United States Patent
Kim et al.

(10) Patent No.: US 9,046,904 B2
(45) Date of Patent: Jun. 2, 2015

(54) APPARATUS AND METHOD FOR CONTROLLING PULSE FREQUENCY MODULATION IN SINGLE-INDUCTOR DUAL-OUTPUT POWER CIRCUIT

(71) Applicant: Dongbu HiTek Co., Ltd., Gyeonggi-do (KR)

(72) Inventors: Jongcheol Kim, Gyeonggi-do (KR); Seung nam Park, Gyeonggi-do (KR)

(73) Assignee: Dongbu Hitek Co., Ltd. (KR)

( * ) Notice: Subject to any disclaimer, the term of this patent is extended or adjusted under 35 U.S.C. 154(b) by 178 days.

(21) Appl. No.: 13/768,310

(22) Filed: Feb. 15, 2013

(65) Prior Publication Data

US 2013/0249507 A1 Sep. 26, 2013

(30) Foreign Application Priority Data

Mar. 26, 2012 (KR) ........................ 10-2012-0030652

(51) Int. Cl.
  G05F 1/577 (2006.01)
  G05F 1/10 (2006.01)
(52) U.S. Cl.
  CPC ....................................... G05F 1/10 (2013.01)
(58) Field of Classification Search
  CPC ............. G05F 3/24; G05F 1/56; G05F 1/577; H02M 3/1588; H02M 3/156; H02M 3/157
  USPC ......... 323/247, 265, 271, 282–285, 288, 351, 323/267
  See application file for complete search history.

(56) References Cited

U.S. PATENT DOCUMENTS

| | | | | |
|---|---|---|---|---|
| 6,075,295 | A | 6/2000 | Li | |
| 6,894,465 | B2 * | 5/2005 | Sutardja et al. | 323/268 |
| 6,933,711 | B2 * | 8/2005 | Sutardja et al. | 323/283 |
| 6,979,988 | B2 * | 12/2005 | Sutardja et al. | 323/283 |
| 7,026,795 | B2 * | 4/2006 | So | 323/222 |
| 7,368,898 | B2 * | 5/2008 | Sutardja et al. | 323/285 |
| 7,443,148 | B2 * | 10/2008 | Weng | 323/271 |
| 7,482,791 | B2 * | 1/2009 | Stoichita et al. | 323/271 |
| 7,622,904 | B2 * | 11/2009 | Sutardja et al. | 323/282 |
| 7,782,036 | B1 * | 8/2010 | Wong et al. | 323/282 |
| 8,400,131 | B2 * | 3/2013 | Li et al. | 323/284 |
| 2004/0196676 | A1 | 10/2004 | Ishii et al. | |

FOREIGN PATENT DOCUMENTS

| | | |
|---|---|---|
| JP | 2004-096816 | 3/2004 |
| JP | 2004-304987 | 10/2004 |
| JP | 2007-236141 | 9/2007 |
| KR | 10-2008-0051657 | 6/2008 |

* cited by examiner

*Primary Examiner* — Adolf Berhane

(74) *Attorney, Agent, or Firm* — Andrew D. Fortney; Central California IP Group, P.C.

(57) ABSTRACT

An apparatus configured to control a pulse frequency modulation in a single-inductor dual-output power circuit. The apparatus fixes a pulse width of one of a maximum on-time pulse signal (which is used to define a maximum on-time during which a current flowing through the inductor is generated) and a minimum off-time pulse signal (which is used to define a minimum off-time during which either the boost voltage converter or the buck-boost voltage converter produces a positive voltage or a negative voltage). The apparatus adjusts a pulse width of the other pulse signal.

20 Claims, 5 Drawing Sheets

APPARATUS AND METHOD FOR CONTROLLING PULSE FREQUENCY MODULATION IN SINGLE-INDUCTOR DUAL-OUTPUT POWER CIRCUIT

The present application claims priority under 35 U.S.C. 119 and 35 U.S.C. 365 to Korean Patent Application No. 10-2012-0030652 (filed on Mar. 26, 2012), which is hereby incorporated by reference in its entirety.

BACKGROUND

Liquid crystal panels (e.g. dot inversion panels) may use a single-inductor dual-output power. A plurality of boost voltage converters sharing a single inductor may produce single-inductor dual-output power, which may be used to apply positive and negative power to a liquid crystal panel.

Example FIG. 1 illustrates a circuit diagram of a single-inductor dual-output power circuit, in accordance with the related art. The single-inductor dual-output power circuit 100 may include a boost voltage converter 110 and a buck-boost voltage converter 120. The boost voltage converter 110 may apply a positive voltage DDVDH for a liquid-crystal drive to a load R1. A buck-boost voltage converter 120 may apply a negative voltage DDVDL to a load R2. The boost voltage converter 110 and the buck-boost voltage converter 120 share a first switch element M1, a second switch element M2, and an inductor L. The boost voltage converter 110 and the buck-boost voltage converter 120 include diodes D1 and D2 for performing rectification functions, capacitors C1 and C2 for performing smoothing functions, serial buffers B1 through B4 for adjusting rising and falling times, respectively.

A single-inductor dual-output power circuit 100 may allow the first switch element M1 and the second switch element M1 to perform alternate switching operations by a first switch control signal CNT1 and a second switch control signal CNT2, which may be applied from an apparatus for controlling a pulse frequency modulation. The result of the signal CNT1 may be generation of the positive voltage DDVDH and the negative voltage DDVDL. The generated positive and negative voltages DDVDH and DDVDL may be provided to the loads R1 and R2, respectively.

If both the first switch element M1 and the second switch element M2 are turned-on, a current flows through the inductor L. A period when both the first switch element M1 and the second switch element M2 are turned-on may be referred to as a maximum on-time. An on-time pulse signal used for the maximum on-time may be set to have a preset period.

If the second switch element M1 is turned-on and the first switch element M1 is turned-off, the current passing through the inductor L is charged into the first capacitor C1, which may cause a rise of the positive voltage DDVDH. If the first switch element M1 is turned-on and the second switch element M2 is turned-off, the current passing through the inductor L is charged into the second capacitor C2, which causes a drop in the negative voltage DDVDL. When both the first and second switch elements M1 and M2 are turned-off, the current passing through the inductor L is charged into both the first and second capacitors C1 and C2, which may cause the positive voltage DDVDH to rise and the negative voltage DDVDL to fall. Accordingly, a period when at least one of the first and second switch elements M1 and M2 is turned-off may be referred to as the minimum off-time. An off-time pulse signal may be used for defining the minimum off-time to a preset period.

However, when the on-time and off-time pulse signals are fixed in period, a peak current flowing through the inductor L increases in order to meet a desired current capacity of the converter. As a result, noise and electromagnetic interference (EMI) may be generated in the converted voltages.

FIG. 2 illustrates a waveform diagram of a current of the inductor when a maximum on-time pulse signal and a minimum off-time pulse signal have fixed periods, in accordance with the related art. A first interval INTERVAL1 indicates a period that the first switch element M1 is alternately turned on and turned off while the second switch element M2 maintains a turned-on state. A second interval INTERVAL2 indicates a period that both the first and second switch elements M1 and M2 are alternately turned on and turned off.

When the positive voltage DDVDH rises in the first interval INTERVAL1, the current $I_L$ of the inductor L may decreases with an inclination of (DDVDH−VCI)/L even though the turning-on voltage of the first diode D1 is disregarded. In the second interval, INTERVAL2 when the positive voltage DDVDH rises and the negative voltage DDVDL falls, the current $I_L$ of the inductor L decreases with an inclination of '(DDVDH+|DDVDL|)/L' even though the turning-on voltages of the first and second diodes D1 and D2 are disregarded. Accordingly, it may be necessary to flow a considerable quantity of peak current through the inductor L, in order to meet a desired current capacity of the converter. In addition, since the maximum on-time and minimum off-time pulse signals are fixed in period, the inductor current $I_L$ may suddenly increase depending on the controlled states, as shown in FIG. 2.

SUMMARY

Embodiments relate to controlling a single-inductor dual-output power circuit. Embodiments relate to an apparatus and method for controlling a pulse frequency modulation in a single-inductor dual-output power circuit having a boost voltage converter and buck-boost voltage converter. Embodiments relate to an apparatus and method for controlling a pulse frequency modulation, which are adapted to adjust a pulse width of one of on-time and off-time pulse signals, which may prevent a undesirable over increments in a peak current flowing through an inductor.

Embodiments relate to an apparatus configured to fix a pulse width of: (1) a maximum on-time pulse signal which is used to define a maximum on-time during which a current flowing through the inductor is generated and/or (2) a minimum off-time pulse signal which is used to define a minimum off-time during which either the boost voltage converter or the buck-boost voltage converter produces a positive voltage or a negative voltage. In embodiments, an apparatus is configured to adjust a pulse width of the other pulse signal.

In embodiments, the pulse width of the other pulse signal may be adjusted depending on a comparison resultant of the positive voltage with a first reference value and a comparison resultant of the negative voltage with a second reference value.

In embodiments, an apparatus comprises at least one of: (1) A first comparison unit configured to compare the positive voltage with the first reference value. (2) A second comparison unit configured to compare the negative voltage with the second reference value. (3) A controller configured to generate a pulse width adjustment signal which is used to adjust the pulse width of the other pulse signal, switch control signals for the boost voltage converter and the buck-boost voltage converter on the basis of the comparison resultants from the first and second comparison units. A pulse width adjuster configured to adjust the pulse width of the other pulse signal according to the pulse width adjustment signal.

In embodiments, the pulse width adjuster is configured to adjust a pulse width of the maximum on-time pulse signal and adjust a first minimum off-time pulse signal for defining: (1) a first minimum off-time during which the boost voltage converter outputs the positive voltage, (2) a second minimum off-time pulse signal defining a second minimum off-time during the buck-boost voltage converter outputs the negative voltage, and (3) a third minimum off-time pulse signal defining a third minimum off-time during which the boost voltage converter outputs the positive voltage and the buck-boost voltage converter outputs the negative voltage.

In embodiments: (1) The first minimum off-time pulse signal is adjusted to have the widest pulse width of the first minimum off-time pulse signal, the second minimum off-time pulse signal, and the third minimum off-time pulse signal. (2) The second minimum off-time pulse signal is adjusted to have an intermediate pulse width less than the first minimum off-time pulse signal and greater than the third minimum pulse signal. (3) The third minimum off-time pulse signal is adjusted to have a pulse width less than both the first and second minimum pulse signal.

In embodiments, the method comprises at least one of: (1) Fixing a pulse width of any one of the maximum on-time pulse signals, which is used to define (a) a maximum on-time during which a current flowing through the inductor is generated and (b) a minimum off-time pulse signal which is used to define a minimum off-time during which either the boost voltage converter or the buck-boost voltage converter produces a positive voltage or a negative voltage. (2) Adjusting a pulse width of the other pulse signal.

In embodiments, the adjusting a pulse width of the other pulse signal comprises adjusting the pulse width of the other pulse signal depending on a comparison resultant of the positive voltage with a first reference value and a comparison resultant of the negative voltage with a second reference value.

DRAWINGS

The above and other objects and features of embodiments will become apparent from the following description of embodiments, given in conjunction with the accompanying drawings, in which.

DESCRIPTION

Figure 1:
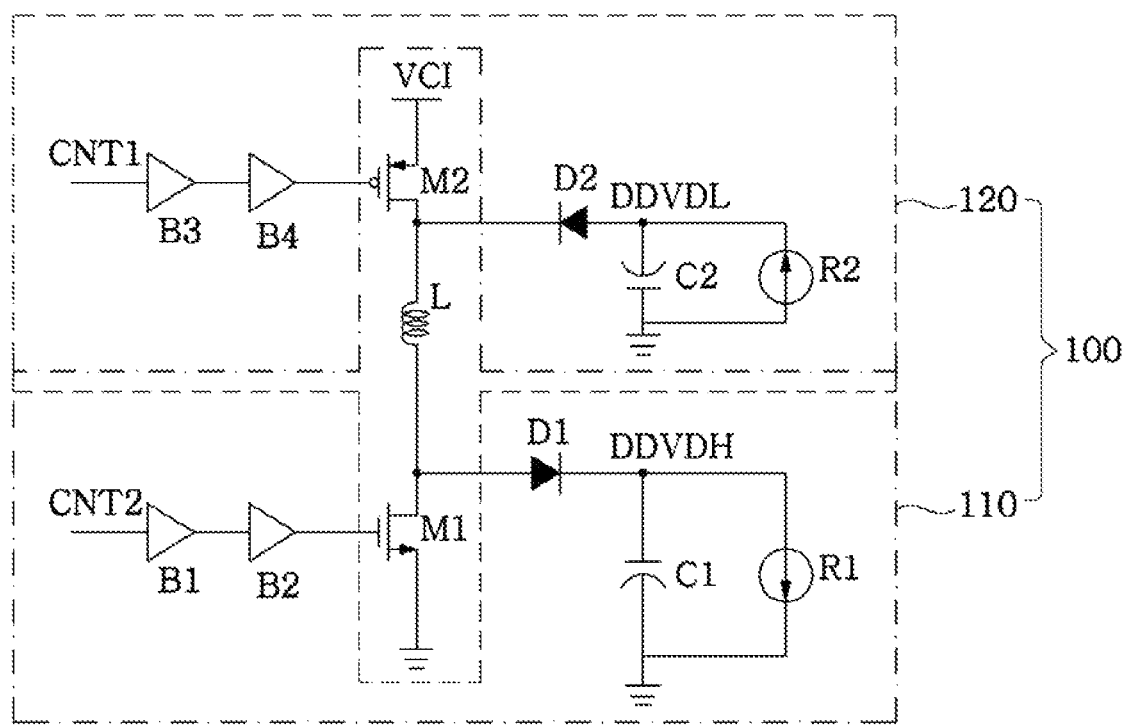
FIG. 1 illustrates a circuit diagram of a single-inductor dual-output power circuit, in accordance with the related art.
Figure 2:
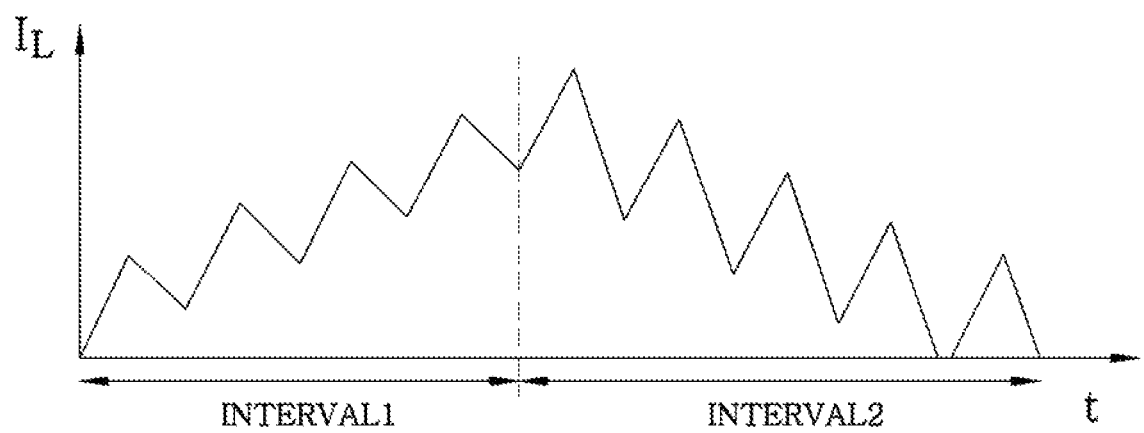
FIG. 2 illustrates a waveform diagram of a current of the inductor when a maximum on-time pulse signal and a minimum off-time pulse signal each have fixed widths, in accordance with the related art.

The advantages and features of embodiments and methods of accomplishing these will be clearly understood from the following described embodiments taken in conjunction with the accompanying drawings. However, embodiments are not limited to those embodiments and may be implemented in various forms. It should be noted that the present embodiments are provided to make a full disclosure and also to allow those skilled in the art to know the full range of the embodiments. Therefore, embodiments are to be defined only by the scope of the appended claims. Further, like reference numerals refer to like elements throughout the specification.

In the following description, well-known functions or constitutions will not be described in detail if they would obscure the invention in unnecessary detail. Further, the terminologies to be described below are defined in consideration of functions in the invention and may vary depending on a user's or operator's intention or practice.

Figure 3:
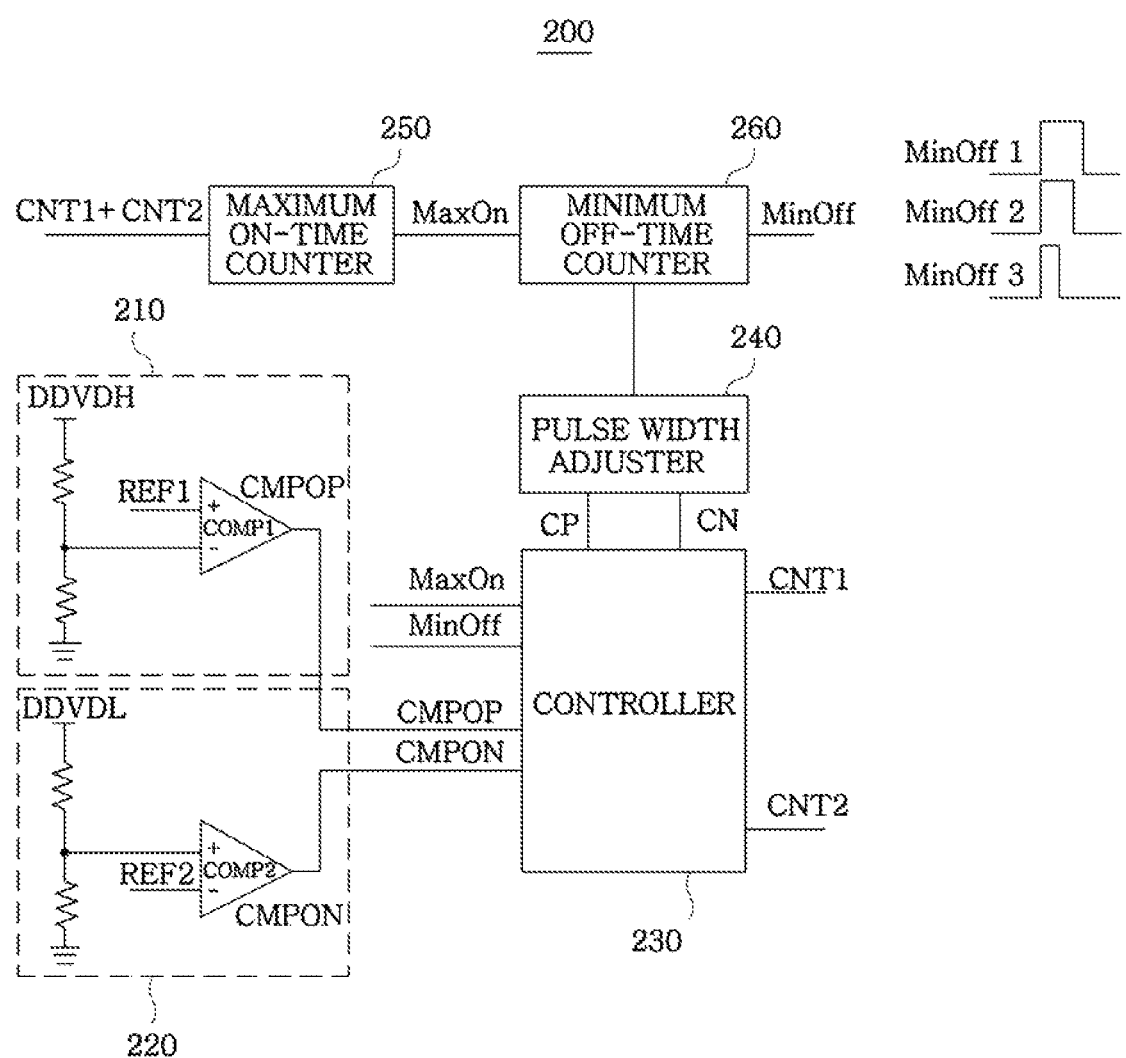
FIG. 3 illustrates a circuit diagram of an apparatus for controlling a pulse frequency modulation in a single-inductor dual-output power circuit, in accordance with embodiments.

FIG. 3 illustrates a circuit diagram of an apparatus for controlling a pulse frequency modulation in a single-inductor dual-output power circuit, in accordance with embodiments. An apparatus 200 for controlling a pulse frequency modulation may include first and second comparison units 210 and 220, a controller 230, and a pulse width adjuster 240. The first comparison unit 210 compares a positive voltage DDVDH (e.g. which may be applied from a boost voltage converter 110 of a single-inductor dual-output power circuit 100) with a first reference value REF1. The second comparison unit 220 may compare a negative voltage (e.g. which may be applied from a buck-boost voltage converter 120 of the single-inductor dual-output power circuit 100) with a second reference value REF2. The controller 230 may derive pulse width adjustment signals CP and CN, and first and second switch control signals CNT1 and CNT2 from comparison resultants CMPOP and CMPON from the first and second comparison units 210 and 220. The pulse width adjustment signal CP and CN may be used to adjust the pulse width of at least one of a maximum on-time pulse signal and a minimum off-time pulse signal (e.g. the pulse width of the minimum off-time pulse signal). The first switch control signal CNT1 may be used to control the buck-boost voltage converter 120. The second switch control signal CNT2 may be used to control the boost voltage converter 110. The pulse width adjuster 240 may control the pulse width of at least one of the maximum on-time and the minimum off-time pulse signal (e.g. the pulse width of the minimum off-time pulse signal depending on the pulse width adjustment signals CP and CN).

In embodiments, the apparatus 200 may include a maximum on-time counter 250 and a minimum off-time counter 260. The maximum on-time counter 250 may start to count a maximum on-time of a fixed pulse width in response to the first and second switch control signals CNT1 and CNT2 and may generate the maximum on-time pulse signal MaxOn. The minimum off-time counter 260 may start to count the minimum off-time of a pulse width which may be adjusted and determined by the pulse width adjuster 240 when the counting of the maximum on-time in the maximum on-time counter is terminated. Through the counting operation, the minimum off-time counter 260 generates the minimum off-time pulse signal MinOff.

Example operations of the apparatus 200 having the above-mentioned configuration (e.g. for use in the single-inductor dual-output power circuit 100) are described below, with reference to FIG. 1 and FIG. 4, in accordance with embodiments. The single-inductor dual-output power circuit 100 shown in FIG. 1 may driven by the first and second switch control signals CNT1 and CNT2 provided from the apparatus 200. A current flowing through the inductor L may be generated and then either a positive voltage DDVDH is output from the boost voltage converter 110 or a negative voltage DDVDL is output from the buck-boost voltage converter 120.

The first comparison unit 210 may compare the positive voltage DDVDH, which may be applied from the boost voltage converter 110, with the first reference value REF1 and may output a comparison resultant CMPOP. The second comparison unit 220 may compare the negative voltage DDVDL, which may be applied from the buck-boost voltage converter 120, with the second reference value REF2 and may output a comparison resultant CMPON.

The controller 230 may generate pulse width adjustment signals CP and CN in response to the comparison resultants CMPOP and CMPON of the first and second comparison units 210 and 220, in accordance with embodiments. In embodiments, the pulse width adjustment signals CP and CN may be used to adjust the pulse width of one of the maximum on-time and minimum off-time pulse signals MaxOn and MinOff (e.g. the pulse width of the minimum off-time pulse signal). In embodiments, the controller 230 may receive the maximum on-time pulse signal MaxOn generated in the maximum on-time counter 250 and the minimum off-time pulse signal MinOff generated in the minimum off-time counter 260 to perform feedback control.

For example, the controller 230 may generate a pulse width adjustment standby signal when both of the comparison resultants CMPOP and CMPON output from the first and second comparison units 210 and 220 have a low logic level. If the comparison resultant CMPOP output from the first comparison unit 210 has a low logic level and the comparison resultant CMPON output from the second comparison unit 220 has a high logic level, the controller 230 outputs the pulse width adjustment signals CP and CN for controlling a second minimum off-time pulse signal MinOff2 for defining a second minimum off-time, in accordance with embodiments.

In embodiments, the second minimum off-time pulse signal may cause the buck-boost voltage converter 120 to output the negative voltage DDVDL. In the case that the comparison resultant CMPOP output from the first comparison unit 210 has a high logic level and the comparison resultants CMPON output from the second comparison unit 220 has a low logic level, the controller 230 outputs the pulse width adjustment signals CP and CN for controlling a first minimum off-time pulse signal MinOff1 for defining a first minimum off-time, in accordance with embodiments.

In embodiments, the first minimum off-time pulse signal may cause the boost voltage converter 110 to output the positive voltage DDVDH. If both of the comparison resultants CMPOP and CMPON output from the first and second comparison units 210 and 220 have a high logic level, the controller 230 may output the pulse width adjustment signals CP and CN for controlling a third minimum off-time pulse signal MinOff3 for defining a third minimum off-time, in accordance with embodiments. In embodiments, the third minimum off-time pulse signal causes the boost and buck-boost voltage converters 110 and 120 to output the positive and negative voltages DDVDH and DDVDL, respectively.

The pulse width adjuster 240 may then control the minimum off-time counter 260 to generate one of the first through third minimum off-time pulse signals as a minimum off-time pulse signal MinOff in response to the pulse width adjustment signals CP and CN applied from the controller 230, in accordance with embodiments. In embodiments, the pulse width adjuster 240 performing the control of the minimum off-time counter 260 may set the first through third minimum off-time pulse signals MinOff1 through MinOff3 to have different widths from one another. For example, in embodiments, the first minimum off-time pulse signal MinOff1 may be set to have the widest pulse width, the second minimum off-time pulse signal MinOff2 may be set to have an intermediate pulse width, and the third minimum off-time pulse signal MinOff3 may be set to have the smallest pulse width.

Figure 4:
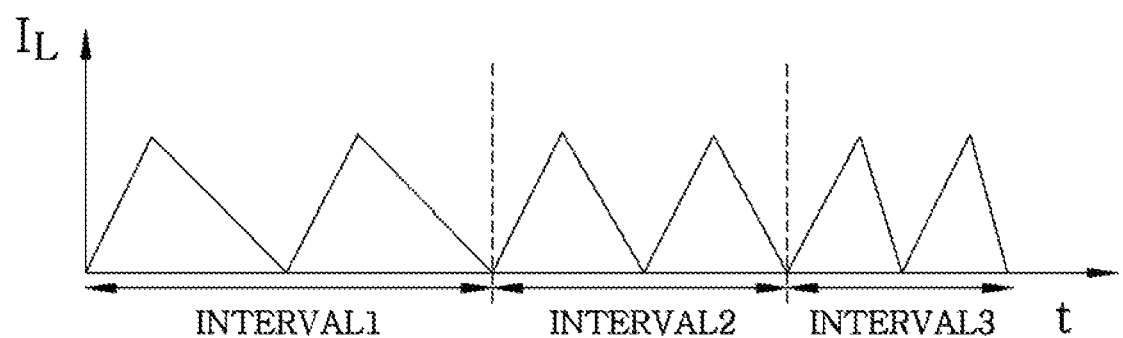
FIG. 4 illustrates a waveform diagram illustrating a current of the inductor when the width of a minimum off-time pulse signal is adjusted, in accordance with embodiments.

FIG. 4 is a waveform diagram illustrating a current of the inductor when the width of a minimum off-time pulse signal is adjusted, in accordance with embodiments. A first interval INTERVAL1 may be a period that the first switch element M1 is alternately turned on and turned off while the second switch element M2 maintains a turned-on state, in accordance with embodiments. A second interval INTERVAL2 may be a period that the second switch element M2 is alternately turned on and turned off during the first switch element M1 maintains a turned-on state. A third interval INTERVAL3 may be a period that both of the first and second switch elements M1 and M2 are alternately turned on and turned off.

When the positive voltage DDVDH rises in the first interval INTERVAL1, the current of the inductor L may decreases with an inclination of (DDVDH−VCI)/L even though the turning-on voltage of the first diode D1 is not applied. When the negative voltage DDVDH falls in the second interval INTERVAL2, the current of the inductor L may decrease with an inclination of (|DDVDL|−VCI)/L even though the turning-on voltage of the second diode D2 is not applied. In the third interval INTERVAL3, when the positive voltage DDVDH rises and the negative voltage DDVDL falls, the current of the inductor L may decrease with an inclination of (DDVDH+|DDVDL|)/L even though the turning-on voltages of the first and second diodes D1 and D2 are not applied. In the related art with fixed pulse widths of the maximum on-time and minimum off-time pulse signals, there may be intervals in which the inductor current $I_L$ suddenly increases according to the controlled states. However, in embodiments, the pulse width of the minimum off-time pulse signal MinOff may be controlled according to the respective control states. Accordingly, in embodiments, the current flowing through the inductor L may be charged into the capacitors C1 and C2 for sufficient time duration. Accordingly, the inductor current $I_L$ may be prevented from increasing abnormally, as illustrated in example FIG. 4. Therefore, an apparatus for controlling a pulse frequency modulation in accordance with embodiments may prevent the generation of noise and EMI in the single-inductor dual-output power circuit.

Although embodiments have been described in which apparatus 200 adjusts the pulse width of the minimum off-time pulse signal, it will be appreciated to those skilled in the art that the adjustment of the pulse width of the maximum on-time pulse signal instead of that of the minimum off-time pulse signal may also provide the same or similar effect as mentioned above.

Figure 5:
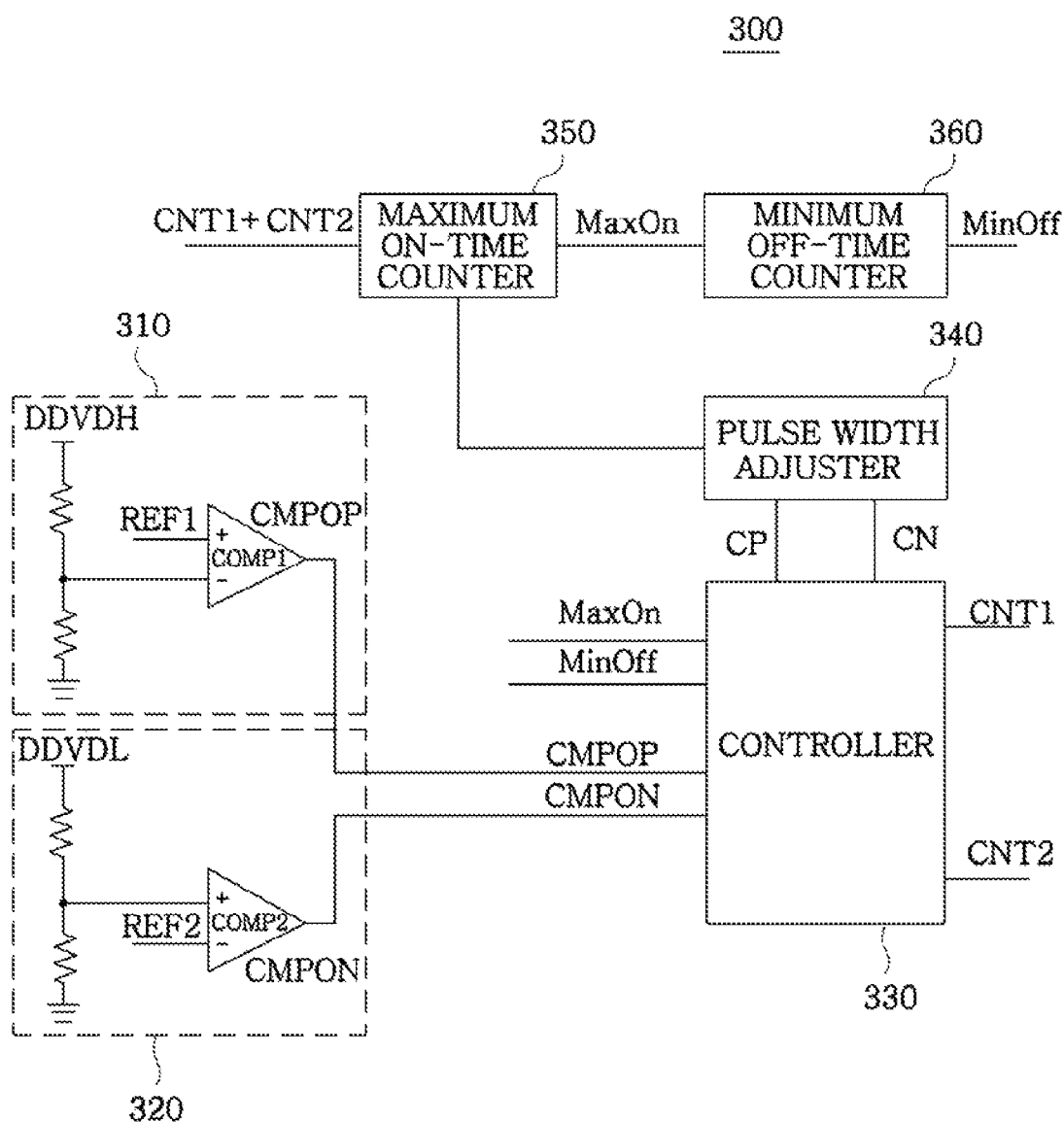
FIG. 5 is a circuit diagram of an apparatus for controlling a pulse frequency modulation in a single-inductor dual-output power circuit, in accordance with embodiments.

FIG. 5 is a circuit diagram of an apparatus for controlling a pulse frequency modulation in a single-inductor dual-output power circuit, in accordance with embodiments. An apparatus 300 for controlling a pulse frequency modulation may include first and second comparison units 310 and 320, a controller 330, and a pulse width adjuster 340, in accordance with embodiments. The first comparison unit 310 may compares positive voltage DDVDH applied from a boost voltage converter 110 of a single-inductor dual-output power circuit 100, with a first reference value REF1. The second comparison unit 320 may compare a negative voltage applied from a buck-boost voltage converter 120 of the single-inductor dual-output power circuit 100, with a second reference value REF2. The controller 330 may derive pulse width adjustment signals CP and CN and first and second switch control signals CNT1 and CNT2 from comparison resultants of the first and second comparison units 310 and 320. The pulse width adjustment signal CP and CN may be used to adjust the pulse width of one of a maximum on-time pulse signal and a minimum off-time pulse signal (e.g. the pulse width of the maximum on-time pulse signal). The first switch control signal CNT1 may be used to control the buck-boost voltage converter 120. The second switch control signal CNT2 may be used to control the boost voltage converter 110. The pulse width adjuster 340 may control the pulse width of one of the maximum on-time and the minimum off-time pulse signal (e.g. the pulse width of the minimum off-time pulse signal depending on the pulse width adjustment signals CP and CN).

The apparatus 300 may includes a maximum on-time counter 350 and a minimum off-time counter 360, in accordance with embodiments. The maximum on-time counter 350 may start to count the maximum on-time of a pulse width which is adjusted and determined by the pulse width adjuster 340, in response to the first and second switch control signals CNT1 and CNT2. Through the counting operation, the maximum on-time counter 350 may generate the maximum on-time pulse signal MaxOn having the adjusted pulse width. The minimum off-time counter 260 may start to count a minimum off-time of a fixed pulse width and generate the minimum off-time pulse signal MinOff having the fixed pulse width, when the counting of the maximum on-time in the maximum on-time counter 350 is terminated.

Example operations of the apparatus 300 having the above-mentioned configuration, for use in the single-inductor dual-output power circuit 100, will now be explained with reference to the circuit diagram of FIG. 1, in accordance with embodiments. The single-inductor dual-output power circuit 100 shown in FIG. 1 may be driven by the first and second switch control signals CNT1 and CNT2 provided from the apparatus 300. Accordingly, in embodiments a current flowing through the inductor L may be generated, and then a positive voltage DDVDH may be output from the boost voltage converter 110 and/or a negative voltage DDVDL can be output from the buck-boost voltage converter 120.

In embodiments, the first comparison unit 310 may compare the positive voltage DDVDH, which is applied from the boost voltage converter 110, with the first reference value REF1 and output a comparison resultant CMPOP. In embodiments, the second comparison unit 320 may compare the negative voltage DDVDL, which may be applied from the buck-boost voltage converter 120, with the second reference value REF2 and output a comparison resultant CMPON.

The controller 330 may generate pulse width adjustment signals CP and CN in response to the comparison resultants CMPOP and CMPON of the first and second comparison units 310 and 320, in accordance with embodiments. In embodiments, the pulse width adjustment signals CP and CN may be used to adjust the pulse width of one of the maximum on-time and minimum off-time pulse signals MaxOn and MinOff (e.g. the pulse width of the maximum on-time pulse signal MaxOn). In embodiments, the controller 330 may receive the maximum on-time pulse signal MaxOn generated in the maximum on-time counter 350 and the minimum off-time pulse signal MinOff generated in the minimum off-time counter 360 to perform feedback control.

In response to the pulse width adjustment signals CP and CN from the controller 230, the pulse width adjuster 340 may then controls the maximum on-time counter 350, in accordance with embodiments. In embodiments, the maximum on-time counter 350 may generate the maximum on-time pulse signal MaxOn with an adjusted pulse width which is adjusted by the pulse width adjustment signals CP and CN.

Embodiments may adjust the pulse width for one of the maximum on-time pulse signal (which may define the maximum on-time during which a current flowing through the inductor is generated) and the minimum off-time pulse signal (which may define the minimum off-time during which the positive or negative voltage is output). Accordingly, the peak current flowing through the inductor may not increase excessively, making the inductor current stable. Therefore, the generation of power noise and EMI may be prevented.

While embodiments have been shown and described, it will be understood by those skilled in the art that various changes and modification may be made without departing the scope of the embodiments as defined in the following claims.

What is claimed is:

1. An apparatus comprising a boost voltage converter and a buck-boost voltage converter sharing an inductor, wherein the apparatus is configured to:
    fix a pulse width of one of a maximum on-time pulse signal and a minimum on-time pulse signal, wherein the maximum on-time pulse signal defines a maximum on-time during which a current flowing through the inductor is generated, and wherein a minimum off-time pulse signal defines a minimum off-time during which either the boost voltage converter or the buck-boost voltage converter produces a positive voltage or a negative voltage; and
    adjust another pulse width of one of the maximum on-time pulse signal and the minimum on-time pulse signal that was not fixed when said apparatus fixed said pulse width, and
the apparatus comprises:
    a first comparison unit configured to compare the positive voltage with a first reference value;
    a second comparison unit configured to compare the negative voltage with a second reference value;
    a controller configured to generate a pulse width adjustment signal, wherein the pulse width adjustment signal adjusts a pulse width of another pulse signal depending on comparison results of the positive voltage with the first reference value and the negative voltage with the second reference value, and switches control signals for the boost voltage converter and the buck-boost voltage converter on a basis of comparison results from the first comparison unit and the second comparison unit; and
    a pulse width adjuster configured to adjust the pulse width of said another pulse signal according to the pulse width adjustment signal.

2. The apparatus of claim 1, wherein the apparatus is configured to control a pulse frequency modulation in a single-inductor dual-output power circuit.

3. The apparatus of claim 1, wherein the pulse width adjuster is configured to:
    adjust the pulse width of the maximum on-time pulse signal;
    adjust a first minimum off-time pulse signal defining a first minimum off-time during which the boost voltage converter outputs the positive voltage;
    adjust a second minimum off-time pulse signal defining a second minimum off-time during which the buck-boost voltage converter outputs the negative voltage; and
    adjust a third minimum off-time pulse signal defining a third minimum off-time during which the boost voltage converter outputs the positive voltage and the buck-boost voltage converter outputs the negative voltage.

4. The apparatus of claim 3, wherein:
    the first minimum off-time pulse signal has a wider pulse width than the second minimum off-time pulse signal and the third minimum off-time pulse signal;
    the second minimum off-time pulse signal has an intermediate pulse width that is less than the first minimum off-time pulse signal and greater than the third off-time pulse signal; and the third minimum off-time pulse signal has a pulse width less than both the first minimum off-time pulse signal and the second minimum off-time pulse signal.

5. The apparatus of claim 1, further comprising an inductor shared by the boost voltage converter and the buck-boost voltage converter.

6. The apparatus of claim 1, further comprising a maximum on-time counter configured to count the maximum on-time of the pulse width of said one of said maximum on-time pulse signal and said minimum on-time pulse signal fixed by said apparatus, and generate the maximum on-time pulse signal.

7. The apparatus of claim 6, wherein the maximum on-time pulse signal is generated in response to the control signals for the boost voltage converter and the buck-boost voltage converter.

8. The apparatus of claim 6, further comprising a minimum off-time counter configured to count the minimum off-time of the pulse width of said one of said maximum on-time pulse signal and said minimum on-time pulse signal fixed by said apparatus, and generate the minimum off-time pulse signal.

9. The apparatus of claim 8, wherein the minimum off-time is counted when counting of the maximum on-time in the maximum on-time counter is terminated.

10. A dual-output power circuit having pulse frequency modulation, comprising the apparatus of claim 1 and an inductor, wherein the apparatus is configured to control the pulse frequency modulation.

11. A method comprising:
fixing a pulse width of one of a maximum on-time pulse signal and a minimum off-time pulse signal, wherein the maximum on-time pulse signal defines a maximum on-time during which a current flowing through an inductor is generated, and wherein the minimum off-time pulse signal defines a minimum off-time during which one of a boost voltage converter and a buck-boost voltage converter produces a positive voltage or a negative voltage;
adjusting a pulse width of the other one of the maximum on-time pulse signal and the minimum off-time pulse signal that was not fixed when fixing said pulse width of said one of the maximum on-time pulse signal and the minimum off-time pulse signal;
comparing the positive voltage with a first reference value;
comparing the negative voltage with a second reference value;
generating a pulse width adjustment signal;
adjusting a pulse width of another pulse signal according to the pulse width adjustment signal, depending on comparison results of the positive voltage with the first reference value and the negative voltage with the second reference value;
switching control signals for the boost voltage converter and the buck-boost voltage converter with the pulse width adjustment signal on a basis of comparison results from the first comparison unit and the second comparison unit.

12. The method of claim 11, wherein the method is for controls a pulse frequency modulation in a single-inductor dual-output power circuit which includes the boost voltage converter and the buck-boost voltage converter, wherein the boost voltage converter and the buck-boost voltage converter share the inductor.

13. The method of claim 11, further comprising counting the maximum on-time of the pulse width of said one of said maximum on-time pulse signal and said minimum on-time pulse signal fixed by said apparatus.

14. The method of claim 13, further comprising generating the maximum on-time pulse signal in response to the control signals for the boost voltage converter and the buck-boost voltage converter.

15. The method of claim 13, further comprising counting the minimum off-time of the pulse width of said one of said maximum on-time pulse signal and said minimum on-time pulse signal fixed by said apparatus.

16. The method of claim 15, further comprising generating the minimum off-time pulse signal.

17. The method of claim 15, wherein the minimum off-time is counted when counting the maximum on-time is terminated.

18. The method of claim 11, further comprising:
adjusting the pulse width of the maximum on-time pulse signal;
adjusting a first minimum off-time pulse signal defining a first minimum off-time during which the boost voltage converter outputs the positive voltage;
adjusting a second minimum off-time pulse signal defining a second mini off-tim during which the buck-boost voltage converter outputs the negative voltage; and
adjusting a third minimum off-time pulse signal defining a third minimum off-time during which the boost voltage converter outputs the positive voltage and the buck-boost voltage converter outputs the negative voltage.

19. The method of claim 18, wherein:
the first minimum off-time pulse signal has a wider pulse width than the second minimum off-time pulse signal and the third minimum off-time pulse signal;
the second minimum off-time pulse signal has an intermediate pulse width that is less than the first minimum of pulse signal and greater than the third off-time pulse signal; and
the third minimum off-time pulse signal has a pulse width less than both the first minimum off-time pulse signal and the second minimum off-time pulse signal.

20. A method of controlling pulse frequency modulation in a dual-output power circuit which includes a boost voltage converter, a buck-boost voltage converter, and an inductor shared by the boost voltage converter and the buck-boost voltage converter, comprising the method of claim 11.

* * * * *